United States Patent [19]

Murata et al.

[11] Patent Number: 5,230,735
[45] Date of Patent: Jul. 27, 1993

[54] APPARATUS FOR COATING POWDER PARTICLES

[75] Inventors: Hiroshi Murata, Kawagoe; Kimio Miyagawa, Kamifukuoka; Mutsuo Kokubu, Yokohama, all of Japan

[73] Assignees: Nisshin Flour Milling Co., Ltd.; Nisshin Engineering Co., Ltd., both of Tokyo, Japan

[21] Appl. No.: 844,319

[22] Filed: Mar. 2, 1992

Related U.S. Application Data

[63] Continuation of Ser. No. 584,625, Sep. 19, 1990, abandoned.

[30] Foreign Application Priority Data

Sep. 22, 1989 [JP] Japan ............................ 1-247573

[51] Int. Cl.⁵ ..................... B05C 3/00; B05C 5/00
[52] U.S. Cl. ............................. 118/20; 118/21; 118/24; 118/26; 118/62; 118/63; 118/303; 118/417; 239/424.5; 239/427.5
[58] Field of Search ................ 118/20, 21, 24, 26, 118/62, 63, 303, 417, 400; 239/423, 424.5, 427, 427.3, 427.5, 9, 675

[56] References Cited

U.S. PATENT DOCUMENTS

| | | | |
|---|---|---|---|
| 1,984,009 | 12/1934 | Baker et al. | 118/24 |
| 2,805,639 | 9/1957 | Martin | 118/20 |
| 3,198,655 | 8/1965 | Gisiger | 118/303 |
| 3,622,081 | 11/1971 | Marsh | 239/427.5 |
| 3,707,135 | 12/1972 | Kostas | 118/303 |
| 4,141,316 | 2/1979 | Grun | 118/303 |
| 4,390,284 | 6/1983 | Hyde et al. | 118/303 |
| 4,398,493 | 8/1983 | Gillett et al. | 118/303 |

Primary Examiner—W. Gary Jones
Assistant Examiner—Todd J. Burns
Attorney, Agent, or Firm—Wenderoth, Lind & Ponack

[57] ABSTRACT

A method of coating powder particles includes the steps of circulating an air flow containing the powder particles in a dispersed state therein in a cylinder whose inner wall is wetted with a coating liquid to bring the powder particles into contact with the coating liquid on the inner wall, and drying the powder particles thus coated with the coating liquid. An apparatus for coating powder particles comprises a drying chamber including an inner space for drying powder particles on the surfaces of which a coating liquid is deposited while floating the powder particles by an air flow, a powder-particle feeding device connected to the top of the drying chamber for feeding an air flow containing dispersed powder particles into the inner space through a cylindrical path, and a coating-liquid supplying mechanism for wetting the inner wall of the cylindrical path of the powder-particle feeding means.

4 Claims, 5 Drawing Sheets

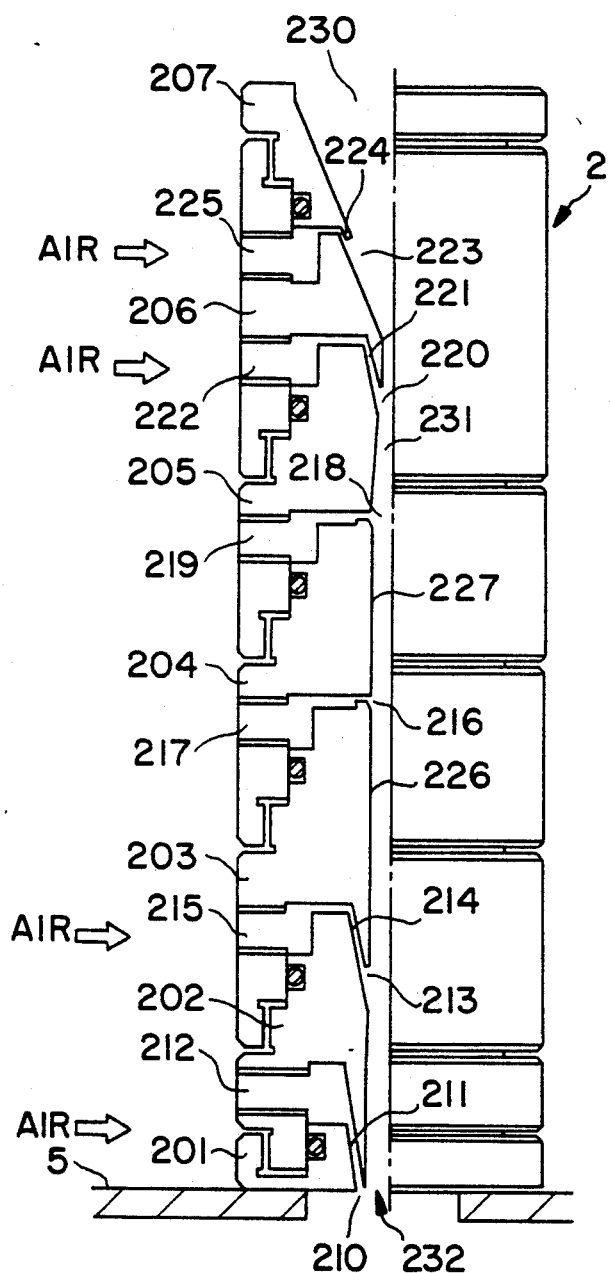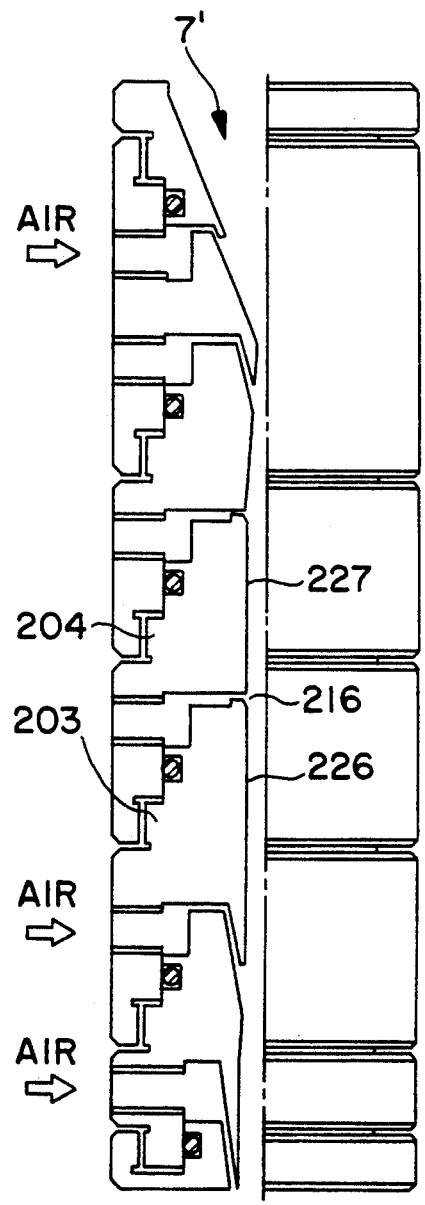
FIG. 2
FIG. 3

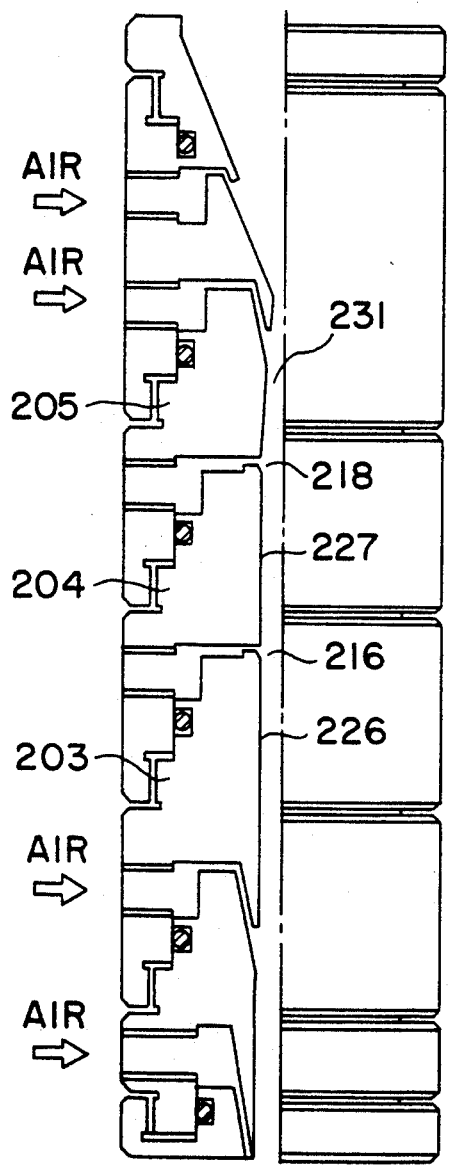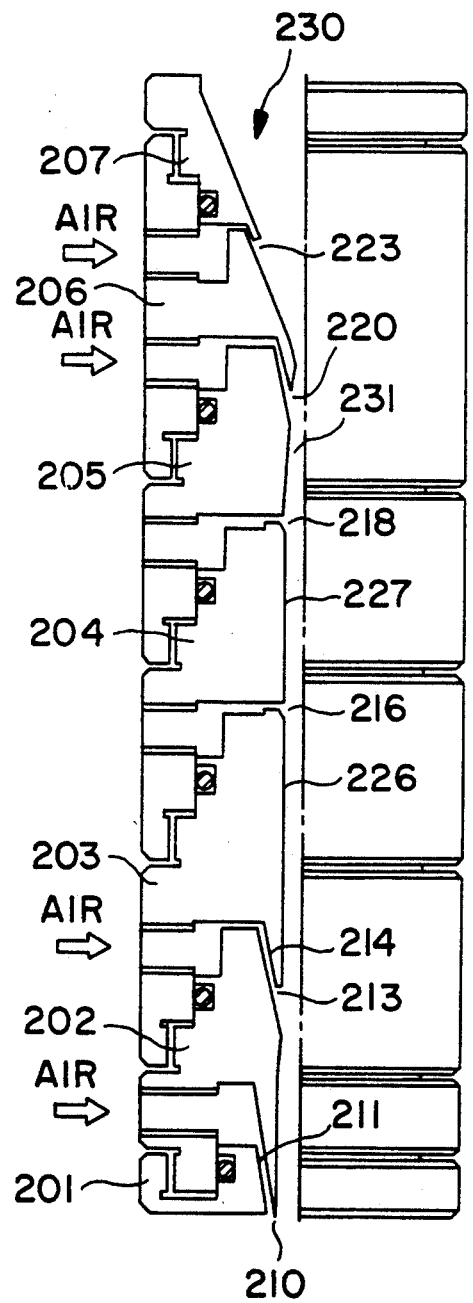

ns to achieve suitable coating, without the above problems. It has been determined to be desirable to bring powder particles and a coating liquid into contact with each other while simultaneously dispersing the particles.

APPARATUS FOR COATING POWDER PARTICLES

This application is a continuation of application Ser. No. 07/584,625 filed Sept. 19, 1990 now abandoned.

BACKGROUND OF THE INVENTION

1. Field of the Invention

The present invention relates to a method of and an apparatus for coating the surfaces of powder particles with a liquid, for example, for coating corn starch powder particles with an aqueous solution of vitamin or the like.

2. Description of the Related Art

It is generally known that various kinds of surface-improving processes are utilized in many fields. For example, in a typical surface-improving process, particles of fine powder having low fluidity are coated with a substance having low adhesiveness for the purposes of improving the fluidity of the fine powder particles and hence the handling thereof. In another surface-improving process, a liquid material is deposited on solid particles so that a particular kind of powder can be used as various powder materials having different compositions.

To achieve such surface improvement or to deposit liquids onto solids, various kinds of methods and apparatus for use in coating the surfaces of powder particles with a liquid have heretofore been proposed. A typical known method is to spray powder particles with a coating liquid from an upper position while fluidizing the powder particles by an air flow. Another known method is to mix powder particles with a liquid by agitating them with a blade means which is rotating at high speeds.

However, as is known, each of the above-described liquid coating methods and apparatus has the problem that if powder particles to be coated are as fine as, for example, 30 μm or less, an appropriate coating cannot be achieved. In general, such fine powder particles have a strong tendency to aggregate and form secondary particles and even if they are floated and fluidized by, e.g., an air flow, they are apt to include a considerable percent of secondary particles derived from the aggregation of primary particles. For this reason, the primary particles which have aggregated and formed the secondary particles cannot be subjected to an appropriate surface coating, thus resulting in the above-described problem.

To solve the problems experienced with the conventional method and apparatus described above, the present inventors have directed intensive efforts to the development of a method and an apparatus both of which are capable of suitably depositing a coating liquid on the surfaces of fine powder particles which tend to easily form secondary particles due to aggregation.

In addition, in the art of coating powder particles, it is desired to handle various deposition states. For example, it may be desired to deposit a liquid onto the entire surfaces of powder particles, or it may be desired to deposit a liquid onto part of the surfaces of powder particles. Desired deposition states differ for individual applications which require powder particles. However, in the conventional coating apparatus, it has been impossible to prepare such various deposition states.

SUMMARY OF THE INVENTION

It is, therefore, an object of the present invention to provide a novel coating method and apparatus which can solve the above-described problems experienced with the conventional coating method and apparatus and which can realize a suitable coating by bringing a coating liquid into contact with sufficiently dispersed powder particles.

It is another object of the present invention to provide a coating apparatus having an improved function which makes it easy to deposit a coating liquid on powder particles in a desired deposition state which is selected from among various deposition states.

To achieve the above-described objects, according to one aspect of the present invention, there is provided a method of coating powder particles which comprises the steps of bringing the powder particles into contact with a coating liquid by circulating an air flow containing the powder particles in a dispersed state thereof in a cylinder whose inner wall is wetted with the coating liquid, and drying the powder particles on which the coating liquid is deposited.

According to another aspect of the present invention, there is provided an apparatus for coating powder particles which comprises drying means including an inner space for drying powder particles on the surfaces of which a coating liquid is deposited while floating the powder particles by an air flow, powder-particle feeding means connected to a top portion of the drying means for feeding an air flow containing dispersed powder particles into the inner space through a cylindrical path, and coating-liquid supplying means for wetting an inner wall of the cylindrical path of the powder-particle feeding means. In a representative arrangement of a coating apparatus having multiple functions which make it possible to select an appropriate one from a plurality of liquid's deposition states, the aforesaid powder-particle feeding means includes inlet port means provided in a top portion of the cylindrical path for feeding the powder particles as they stand or in the state of a slurry, and a nozzle mechanism capable of selectively discharging a liquid, air and slurry as required from a plurality of annular discharge ports which are arranged in layers in the interior of the cylindrical path.

In a particularly representative arrangement, the aforesaid powder-particle feeding means comprises the inlet port means provided in the top portion of the cylindrical path for feeding powder particles as they stand or in the state of a slurry, a nozzle mechanism having a plurality of discharge ports which are disposed in the interior of the cylindrical path for blowing air flows to disperse the powder particles circulated in the cylindrical path, a nozzle mechanism having a first coating-liquid discharge port provided as liquid supplying means, an inner wall of the cylindrical path which is defined as an area to be wetted with the discharged coating-liquid, a nozzle mechanism having a second coating liquid discharge port provided in a bottom portion of the cylindrical path for spraying the coating liquid in the inner space of the drying means, selection means connected to the inlet port means for selecting powder particles to be fed, the selection means being selectively operative to feed the powder particles as they stand or in the state of a slurry, air-flow supplying means for switching on and off the supply of the air flow, the air-flow supplying means being connected to the nozzle mechanism for blowing the air flow, and coating-liquid supplying means connected to each of the nozzle mechanisms having the first and second coating-liquid discharge ports for switching on and off the supply of the coating liquid from each of the nozzle mechanisms.

The aforesaid drying means, in its preferred form, comprises drying-air blowing means for blowing a drying air flow from a bottom portion of the drying means vertically upwardly toward the inlet port means for feeding the powder particles from a top portion of the inner space.

In the above-described arrangement, it is preferable that the powder-particle feeding means constitute an air-flow dispersion mechanism of the type which disperses powder particles by blowing a high-speed air flow into the narrow cylindrical path while passing the powder particles therein. If powder particles to be fed are in the state of a slurry, it is preferable that the strength or position of the air flow to be blown be selected so that the high-speed air flow can break down the slurry of powder particles into dispersed powder particles with a liquid deposited on the surfaces thereof.

In the method and apparatus according to the present invention, it is preferable that the cylindrical path in which an air flow containing powder particles is passed has a structure suitable for dispersing the powder particles. Such a structure is accomplished by the above-described arrangement in which the high-speed air flow is blown into the narrow cylindrical path.

The above-described multi-function coating apparatus according to the present invention can carry out three kinds of coating methods. In one method, the inner wall of the cylindrical path of the powder-particle feeding means is wetted with a coating liquid and an air flow containing powder particles is brought into contact with the coating liquid to deposit it on the powder particles. For the convenience of explanation, the method is hereinafter referred to as a "wetting method". In another method, a coating liquid is discharged with a gas in the form of mist into the inner space of the drying means from the nozzle mechanism having the second coating-liquid discharge port provided in a lower portion of the cylindrical path of the powder-particle feeding means. The coating liquid in the form of mist is brought into contact with powder particles, which are passing in the cylindrical path, and is deposited thereonto. The method is hereinafter referred to as a "deposition method". In the other method, a slurry of powder particles is fed from the inlet port means defined in a top portion of the cylindrical path of the powder-particle feeding means and the slurry of powder particles is broken down into dispersed powder particles by blowing high-speed air flows into the cylindrical path from the periphery thereof. The dispersed powder particles are blown into the inner space of the drying means. The method is hereinafter referred to as a "slurry method".

Particularly preferable examples of the method of discharging a coating liquid into the inner space of the drying means in the state of mist are: a of method in which the coating liquid in the state of a mist is beforehand contained in the high-speed air flow to be blown into the cylindrical path having the function of the aforesaid air-flow dispersing machine; and a method of spraying a coating liquid toward an air flow passing in the cylindrical path by means of a spray nozzle.

The coating method and apparatus according to the present invention can be suitably employed, particularly in the medicine industry, as a method and apparatus for coating an excipient such as corn starch with a liquid in which a pharmaceutically effective substance is dissolved. In addition, the coating method and apparatus can be applied to coating for improving the surfaces of powder particles which require composite natures. Of course, the present invention is also applicable to a process of bringing a liquid protectant such as gelatin into contact with a predetermined solid and forming a protective film.

Other applications of the present inventive method and apparatus are as follows.

Food and Feed

In the field of food and feed, the present invention is applied to, for example, the process of coating a powdered food additive with an oil or fat to conceal the taste and odor of the same, the process of coating a feed material (spray-dried product) with a substance difficult to dissolve in order to prevent the feed material from being dissolved in water or the process of coating porous feed with a waterproofing material. Porous feed which is coated according to the present invention hardly absorbs water.

Medicine

In the field of medicines, the present invention is applied to, for example, the process of coating with an enteric polymer vitamin C particles having an average particle size of 10 $\mu$m. With this coating, the effluence of vitamin C in an artificial gastric fluid (PH 1.2) can be controlled as will be explained in the description of examples.

Ceramics

In the field of ceramics, the present invention is applied to, for example, the process of coating spherical metallic particles with fine ceramic particles or the process of coating ceramic particles with fine ceramic particles.

Coating Film

In the field of coating films, the present invention is applied to, for example, the process of crushing coated particles and dissolving the contents or particles except for a film alone, or the process of slicing particles coated according to an epoxy resin embedding method. The formation of the coating film can be examined by, for example, a transmission type electron microscope.

With the present inventive method and apparatus having the above-described arrangement and construction, it is possible to coat the surfaces of powder particles with a liquid substance and, in addition, the state of coating can be appropriately selected as desired.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIG. 2 is a partially vertical sectional view which serves to illustrate the function of a powder-material feeding device which is effected to implement a "deposition method";

FIG. 3 is a view similar to FIG. 2, but shows the function of the powder-material feeding device which is effected to implement a "single-step wetting method";

FIG. 4 is a view similar to FIG. 2, but shows the function of the powder-material feeding device which is effected to implement a "two-step wetting method";

FIG. 5 is a view similar to FIG. 2, but shows the function of the powder-material feeding device which is effected to implement a "slurry method";

DETAILED DESCRIPTION OF THE PREFERRED EMBODIMENT

A preferred embodiment of the present invention will be described below with reference to the accompanying drawings.

Figure 1:
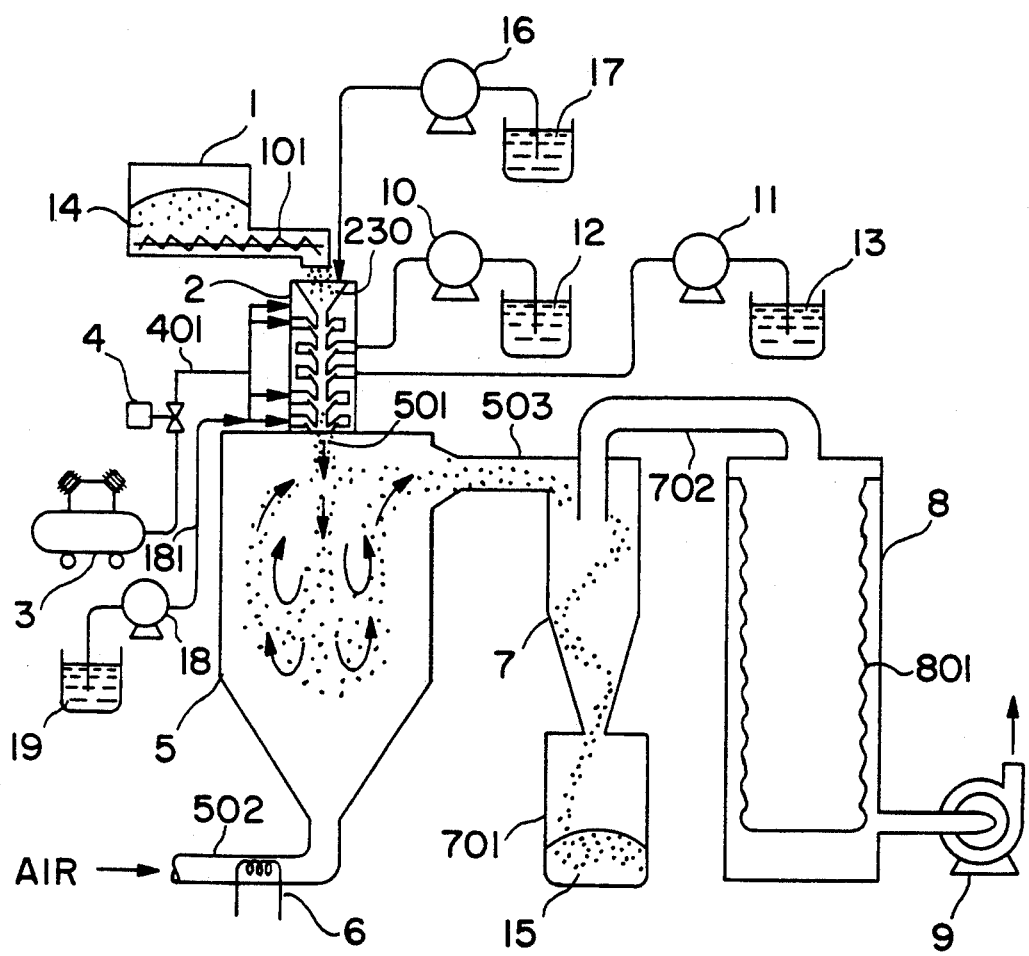
FIG. 1 is a schematic diagram showing the construction of a coating apparatus for coating powder particles with a coating liquid in accordance with the present invention.
Figure 6:
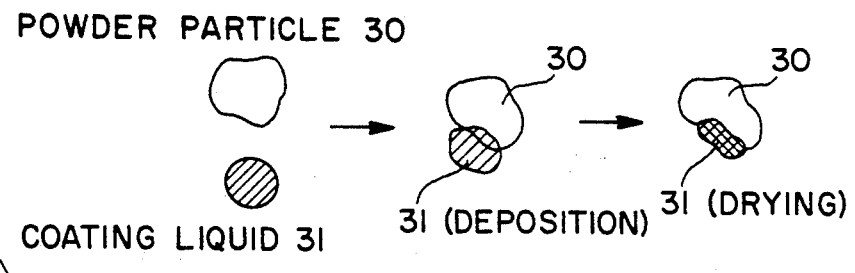
FIG. 6 is a view showing the state of a coated particle obtainable by the "deposition method"

FIG. 1 is a schematic view showing the overall arrangement of an apparatus for coating powder particles with a liquid in accordance with one embodiment of the present invention. The illustrated apparatus comprises the following three major sections: the first section comprising a liquid-powder mixing part including a powder-particle feeding device 2 which performs the function of a powder-particle dispersing machine; the second section comprising a drying part including a drying chamber 5 for drying powder particles on which a coating liquid is deposited; and the third section comprising a recovery part including a cyclone 7 for collecting and recovering dried powder particles.

The powder-particle feeding device 2 which constitutes the liquid-powder mixing part of the first section is disposed on the top of the drying chamber 5. An inlet port 230 is formed in the top end portion of the powder-particle feeding device 2. The inlet port 230 is arranged so that a powder material 14 can be singly fed from a screw feeder 1 into the powder-particle feeding device 2 or so that a powder slurry 17 made of a slurry-like mixture of a powder and a coating liquid can be fed into the same by a feed pump 16. Which of the powder material 14 and the powder slurry 17 should be fed is determined by activating either a screw 101 in the screw feeder 1 or the feed pump 16.

The structure of the powder-material feeding device 2 will be described later in more detail in a description of the operation thereof, taken in conjunction with FIGS. 2 to 5.

The arrangement of the second section will be explained below.

The second section comprises the drying chamber 5 having a cylindrical, hollow shape, and an inlet port 501 is formed approximately in the middle of the top wall of the drying chamber 5. Powder particles on the surfaces of which the coating liquid has been deposited in the powder-material feeding device 2 are blown into the inner space of the drying chamber 5 through the inlet port 501.

The drying chamber 5 has a lower portion with an inverted conical shape, and an air introducing pipe 502 is connected to the bottom of the drying chamber 5. Air, which is fed into the air introducing pipe 502 by an air pump (not shown), is heated by a heater 6 and fed into the drying chamber 5. The heated air flows upwardly approximately in the middle of the drying chamber 5.

The liquid-deposited powder particles which are fed downwardly through the inlet port 501 collide with the heated air which flows upwardly, whereby turbulent flows containing the powder particles are formed in the drying chamber 5. As indicated by the illustrated arrows, the turbulent flows move upwardly into a duct 503 while spreading toward the periphery of the drying chamber 5. The liquid-deposited powder particles are thus conveyed to a collecting cyclone 7 through the duct 503 by an air flow.

The powder particles, which have been conveyed by the air flow to the upper portion of the collecting cyclone 7 which constitutes the recovery part of the third section, are conveyed downwardly in the cyclone 7 by a spiral air flow. The powder particles thus conveyed are stored as coating powder 15 in a tank 701 disposed below the cyclone 7. In the above-described process, extremely fine powder is fed from the top of the collecting cyclone 7 into a duct 702 by a suction negative pressure created by a blower 9. The extremely fine powder is conveyed into a bag filter device 8 by an air flow, filtered by a bag filter 801, and discharged through the blower 9.

With the above-described arrangement, it is possible to deposit a desired coating liquid on the surfaces of powder particles and dry the liquid-deposited powder particles while conveying the powder particles in the state of being dispersed as primary particles.

The detailed structure and operation of the powder-material feeding device used in the presently preferred embodiment will be described below.

The powder-material feeding device 2 used in the embodiment is arranged so that the above-described "deposition method", "wetting method" and "slurry method" can be selectively carried out. To begin with, the "deposition method" will be explained.

In the following description referring to the accompanying drawings, from among annular members stacked in layers, a first-layer annular member corresponds to the lowermost annular member as viewed in the drawings, while a seventh-layer annular member corresponds to the uppermost annular member.

Deposition Method

As shown in detail in FIG. 2, the powder-material feeding device 2 used in the present embodiment is constructed of multiple annular members 201 to 207 which are stacked in layers. The first-layer annular member 201 and the second-layer annular member 202 disposed thereabove are combined to define a second discharge port 210. The second discharge port 210 is formed as a liquid discharge port having the shape of a narrow annular slit which is, as shown, inclined downwardly so that a coating liquid can be sprayed in the inner space of the drying chamber 5. A port 212 communicates with the annular slit-shaped discharge port 210 through a path 211, and the coating liquid stored in a coating-liquid tank 19 is, as shown in FIG. 1, fed to the port 212 through a pipe 181 by a feed pump 18. The port 212 is also supplied with air compressed by a compressor 3 through a regulator 4. The coating liquid is sprayed from the annular slit-shaped discharge port 210 by the supplied compressed air.

The second-layer annular member 202 and a third-layer annular member 203 disposed thereabove are combined to define a discharge port 213, a path 214 having the shape of an annular slit and a port 215 similarly to the discharge port 210, the path 211 having the shape of an annular slit and the port 212.

With the above-described arrangement, the coating liquid is jetted in two layers by high-speed air flows so that, in the "deposition method", the coating liquid can be sufficiently deposited onto powder particles in a powder-containing air flow passing through a cylindrical path 231.

If the feed pump 18 is stopped and only the aforesaid compressed air is supplied through the regulator 4, the discharge ports 210 and 213 function as high-speed air discharge ports. This function is utilized in the "wetting method" and the "slurry method" both of which will be described later.

The combination of the third-layer annular member 203 and a fourth-layer annular member 204 disposed thereabove and the combination of the fourth-layer annular member 204 and a fifth-layer annular member 205 disposed thereabove define a first set of coating-liquid discharge ports 216 and 218 which are utilized in the "wetting method". The inner wall of the third-layer annular member 203 and that of the fourth-layer annular member 204 serve as inner walls 226 and 227 which will be wetted with the coating liquids discharged from the discharge ports 216 and 218, respectively.

An arrangement for implementing the "wetting method" will be described later in greater detail.

The combination of the fifth-layer annular member 205 and a sixth-layer annular member 206 disposed thereabove and the combination of the sixth-layer annular member 206 and a seventh-layer annular member 207 disposed thereabove define paths 221 and 224 for blowing high-speed air flows for the dispersion of powder particles which is important in the "slurry method" and which is also necessary in the other methods.

The blowing path 221 has the shape of a narrow annular slit which is, as shown, inclined downwardly and the outlet end of the path 221 is formed as a discharge port 220. Similarly, the blowing path 224 has the shape of a narrow annular slit which is inclined downwardly, and the outlet end of the path 224 is formed as a discharge port 223. The compressed air supplied through the regulator 4 is fed to the respective paths 221 and 224 through ports 222 and 225 and high-speed air flows are blown into the cylindrical path 231 from the respective discharge ports 220 and 223. With the above-described arrangement, a strong action to disperse powder particles can be imparted to an air flow containing powder particles which is circulated from the top of the powder-material feeding device 2, whereby powder particles of the kind which is relatively difficult to disperse can be sufficiently dispersed. If powder particles are fed in the state of slurry, the slurry is broken down into dispersed powder particles against the adhesiveness of the liquid by the high-speed air flows introduced in the cylindrical path 231.

Each of the sixth and seventh annular members 206 and 207 is tapered to form the upper portion of the cylindrical path 231 into an inverted conical shape, whereby powder particles fed from the top can be smoothly circulated.

The following description is made in connection with a case where coating utilizing the "deposition method" is carried out while powder particles are being fed from the top inlet port 230 of the powder-material feeding device 2. First of all, when a powder material is fed from the screw feeder 1, it is forcibly dispersed by the high-speed air flow blown from the path 224 which is defined between the sixth and seventh annular members 206 and 207 so as to form a high-speed air flow. The air flow containing the dispersed powder particles reaches the bottom of the cylindrical path 231. In the meantime, a coating liquid is jetted together with an air flow from each of the liquid discharge ports 210 and 213 which are respectively defined by the lowermost first-layer annular member 201 and the second-layer annular member 202 disposed thereabove and by the second-layer annular member 202 and the third-layer annular member 203 disposed thereabove. The coating liquid in turn comes into contact with the air flow containing the dispersed powder particles, whereby the coating liquid is deposited on the powder particles.

The state of deposition of the coating liquid on the powder particles is as shown in FIG. 6; that is to say, for example, a coating liquid 31 is deposited on a part of the surface of a powder particle 30.

The powder particles on which the coating liquid is deposited are dried in the drying chamber 5 and collected and recovered in the collecting cyclone 7.

The above-described type of powder particles-powder particles on the surfaces of which a coating liquid is partially coated-are useful in a case where, for example, it is necessary to mix the powder particles and a liquid with another kind of powder particle while ensuring the uniform dispersion of the liquid.

Wetting Method

As shown in FIG. 3, in the wetting method, since the feed pump 18 is stopped, no coating liquid is discharged from the liquid discharge port 210 defined by the first and second annular members 201 and 202 or the liquid discharge port 213 defined by the second and third annular members 202 and 203. Only air flows are blown from the ports 210 and 213 as required.

The manner in which powder particles are fed into the cylindrical path 231 is substantially the same as that used in the above-described "deposition method".

In the example shown in FIG. 3, a coating liquid is discharged from the first coating-liquid discharge port 216 defined by the combination of the third-layer annular member 203 and the fourth-layer annular member 204 disposed thereabove, and the inner wall 226 is wetted by the coating liquid. The coating liquid is, as shown in FIG. 1, supplied from a coating-liquid tank 13 to the first discharge port 216 by a feed pump 11.

An air flow containing powder particles, which is circulated through the cylindrical path 231, comes into contact with the inner wall 226 wetted with the coating liquid, so that the coating liquid is deposited on the powder particles. The powder particles with the deposited coating liquid are fed into the drying chamber 5, where they are dried while being dispersed by an air flow blown into the drying chamber 5 from the bottom thereof. As in the case of the "deposition method" described above, the dried particles are collected and recovered.

The foregoing description refers to a single-step wetting method in which only the inner wall 226 is wetted in the cylindrical path 231. However, referring to FIG. 4, a two-step wetting method may also be implemented if the two inner walls 226 and 227 are wetted by discharging the coating liquid not only from the coating-liquid discharge port 216 defined by the third-layer annular member 203 and the fourth-layer annular member 204 disposed thereabove, but also from the coating-liquid discharge port 218 defined by the fourth-layer annular member 204 and the fifth-layer annular member 205 disposed thereabove. The coating liquid to wet the inner wall 227, which is positioned on an upper side as viewed in FIG. 4, is supplied from the coating liquid tank 12 by the feed pump 10.

The above-described two-step coating-liquid deposition method is particularly useful in the process of improving the wettability of the surfaces of powder particles by using a first liquid and coating the powder particles with a second liquid to be deposited.

Figure 7:
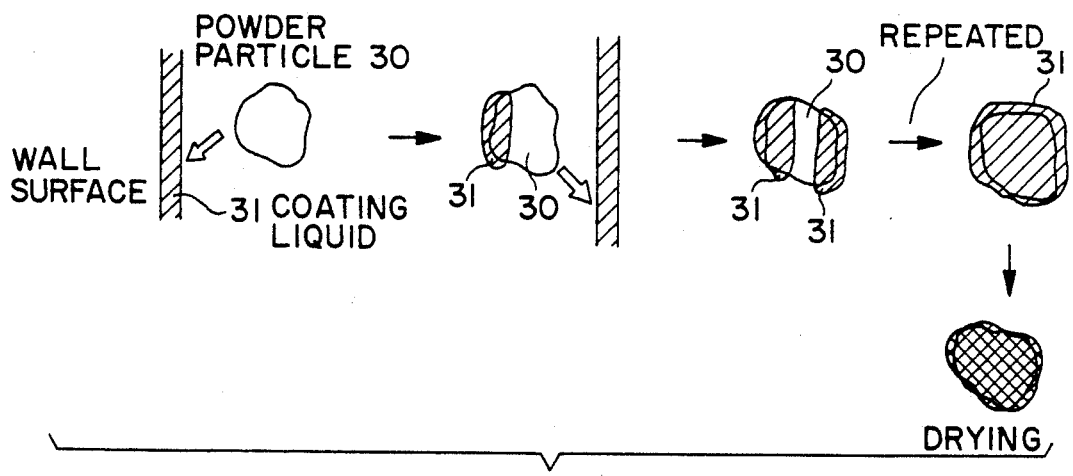
FIG. 7 is a view showing the state of a coated powder particle obtainable by the "wetting method"

The deposition of the coating liquid on the powder particles which is obtained by the above-described "wetting method" is as shown in FIG. 7. As illustrated, for example, the coating liquid 31 is repeatedly deposited onto the surface of the powder particle 30.

Slurry Method

As shown in FIG. 5, in the slurry method, since the feed pump 18 is stopped, no coating liquid is discharged from the liquid discharge port 210 defined by the first and second annular members 201 and 202 or the liquid discharge port 213 defined by the second and third annular members 202 and 203. Only air flows are blown from the ports 210 and 213 as required.

In addition, no coating liquid is discharged from the coating-liquid discharge port 216 defined by the combination of the third-layer annular member 203 and the fourth-layer annular member 204 disposed thereabove or the coating-liquid discharge port 218 defined by the combination of the fourth-layer annular member 204 and the fifth-layer annular member 205 disposed thereabove. Accordingly, neither of the inner walls 226 and 227 is wetted by the coating liquid.

As only high-speed air flows are blown into the cylindrical path 231, the slurry of powder particles is fed into the same from the inlet port 230 by the feed pump 16.

In the slurry of powder particles, since the powder particles are mixed with a liquid as if they were kneaded, the surfaces of the powder particles are completely coated with the liquid and the powder particles are bonded to each other by the adhesiveness of the liquid.

When the slurry of powder particles is fed into the cylindrical path 231, the slurry is forcibly broken down into dispersed powder particles against the adhesiveness of the liquid by the high-speed air flow blown from the path 223 which is defined between the sixth and seventh annular members 206 and 207 so as to form the high-speed air flow. The dispersed powder particles reach the bottom of the cylindrical path 231. The powder particles are further dispersed by an air flow blown from each of the liquid discharge ports 210 and 213 which are defined by the first-layer annular member 201, the second-layer annular member 202 and the third-layer annular member 203. The thus-dispersed powder particles are fed into the drying chamber 5, dried therein, and collected and recovered in a manner similar to that used in the above-described "deposition method".

Figure 8:
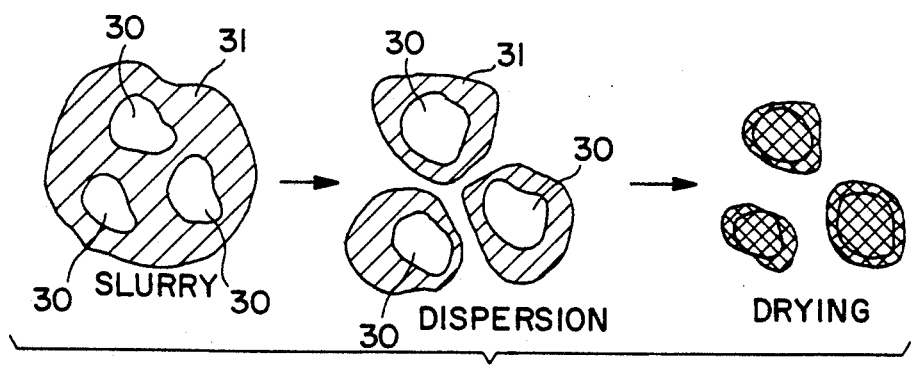
FIG. 8 is a view showing the state of coated powder particles obtainable by the "slurry method"

The state of deposition of the coating liquid on the powder particles obtained by the above-described "slurry method" is as shown in FIG. 8; that is to say, for example, the coating liquid 31 is completely deposited on the surface of the powder particle 30. Accordingly, the slurry method is useful for, e.g., capsulizing powder.

EXAMPLES

Vitamin C (15 μm) was coated with an enteric substance by each of the above-described "deposition method", "wetting method" and "slurry method" by means of the apparatus shown in FIG. 1.

The coated vitamin C prepared by each of the three methods was immersed in an artificial gastric fluid under the condition of pH 1.2 and the state of effluence of the vitamin C was measured. For the purpose of comparison, non-coated vitamin C was subjected to a similar test.

Figure 9:
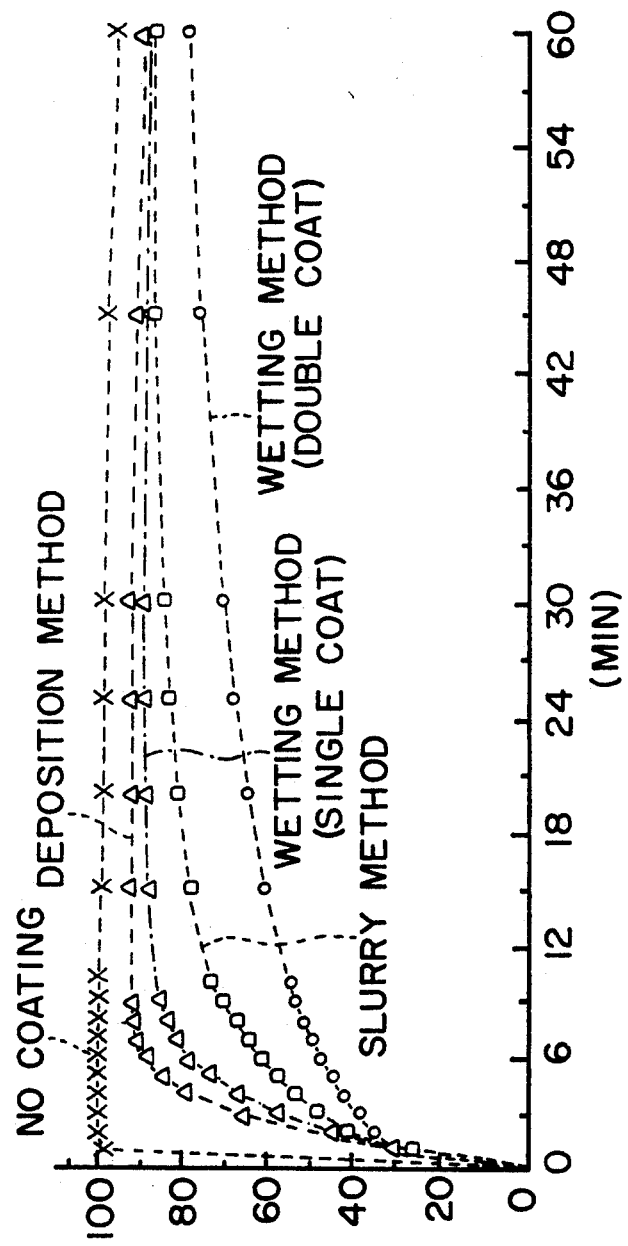
FIG. 9 is a graphic representation showing the result of an experiment which was conducted to examine the states of coatings obtained when the "deposition method", the "wetting method" and the "slurry method" were applied to vitamin C, the result being represented by the relationship between the extent of effluence of vitamin C and time.

The result is shown in FIG. 9.

As can be seen from the result, the degree of effluence differs for each of the coating methods and an optimum coating which matches a desired application can be obtained by selecting an appropriate coating method from them.

It will be appreciated from the foregoing that, in accordance with the present invention, it is possible to suitably coat sufficiently dispersed powder particles with a desired coating liquid, and it is also possible to easily deposit the coating liquid on the powder particles in a desired deposition state which is selected from among various deposition states.

While the present invention has been fully described, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent arrangements and functions.

What is claimed is:

1. An apparatus for coating powder particles, comprising:
   drying means including a space for drying powder particles on the surfaces of which a coating liquid is deposited while floating said powder particles by an air flow;
   powder-particle feeding means connected to a top portion of said drying means for feeding an air flow containing dispersed powder particles into said space through a cylindrical path; and
   supply means comprising multiple annular members stacked in layers to define a plurality of discharge ports in an inner wall of said cylindrical path of said powder-particle feeding means, wherein at least one of said discharge ports opens perpendicularly to said inner wall, each of said plurality of discharge ports being arranged to selectively supply air only, coating liquid only, or coating liquid and air, and when arranged to supply the coating liquid or the coating liquid and air, the inner wall being wetted by the coating liquid, whereby the powder particles contained in the air flow are brought into contact with the inner wall and are coated with the coating liquid.

2. An apparatus for coating powder particles according to claim 1, wherein said drying means comprises drying-air blowing means for blowing a drying air flow from a bottom portion of said drying means vertically upwardly toward said top portion of said drying means.

3. An apparatus for coating powder particles according to claim 1, wherein said powder-particle feeding means includes said cylindrical path which passes said air flow containing said dispersed powder particles, inlet port means provided in a top portion of said cylindrical path for feeding said powder particles as they stand or in the state of a slurry, and means capable of selectively discharging a liquid, air and slurry as required from a plurality of annular slit-shaped discharge ports which are arranged in layers in the interior of said cylindrical path.

4. An apparatus for coating powder particles according to claim 3, wherein said drying means comprises drying-air blowing means for blowing a drying air flow from a bottom portion of said drying means vertically upwarldy toward said top portion of said drying means.

* * * * *